United States Patent [19]

Kaji et al.

[11] Patent Number: 5,079,210

[45] Date of Patent: Jan. 7, 1992

[54] METALLIC SUPPORT FOR EXHAUST GAS PURIFYING CATALYST

[75] Inventors: Gozo Kaji, Aichi; Tatumi Suganuma, Anjo, both of Japan

[73] Assignee: Toyota Jidosha Kabushiki Kaisha, Toyota, Japan

[21] Appl. No.: 612,493

[22] Filed: Nov. 14, 1990

[30] Foreign Application Priority Data

Nov. 16, 1989 [JP] Japan ................... 1-298165

[51] Int. Cl.$^5$ .................. B01J 32/00; B01J 35/04
[52] U.S. Cl. ................... 502/439; 502/527
[58] Field of Search .................. 502/439, 527

[56] References Cited

U.S. PATENT DOCUMENTS 4,857,413  8/1989  Hashimoto et al. ............ 502/439 X
4,948,774  8/1990  Usui et al. ....................... 502/439

FOREIGN PATENT DOCUMENTS 56-4373   1/1981  Japan .
62-194436 12/1987 Japan .
63-77634  5/1988  Japan .

Primary Examiner—W. J. Shine
Attorney, Agent, or Firm—Oblon, Spivak, McClelland, Maier & Neustadt

[57] ABSTRACT

A metallic support for an exhaust gas purifying catalyst includes a honeycomb body, an outer cylinder, and an intermediate cylinder interposed between the honeycomb body and the outer cylinder. The intermediate cylinder has flexible portions disposed on at least one of ends thereof at predetermined intervals in series in a circumferential direction thereof, and the flexible portions are joined to one of the honeycomb body and the outer cylinder. Thus, the flexible portions are made deformable in directions reducing and enlarging the intervals, and the expansion and contraction forces of the honeycomb body and the outer cylinder are absorbed by the deformations of the flexible portions. Consequently, it is possible to prevent thermal stress from generating in the honeycomb body. Thus, breakage of the honeycomb body has been prevented further reliably.

11 Claims, 3 Drawing Sheets

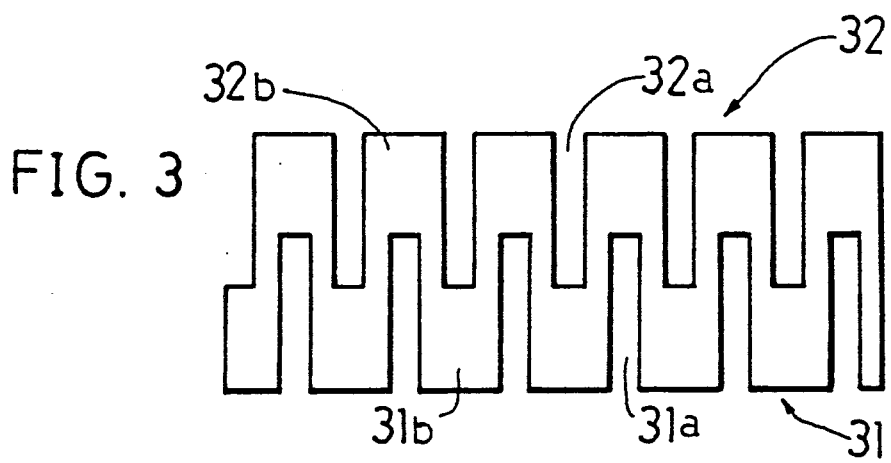
FIG. 3
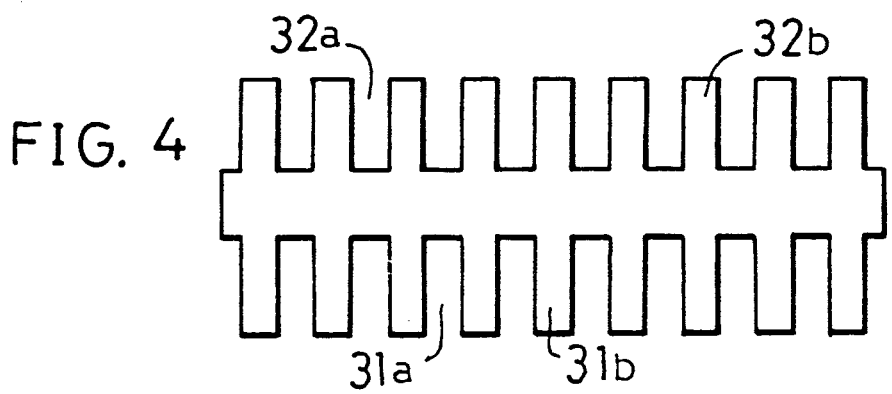
FIG. 4
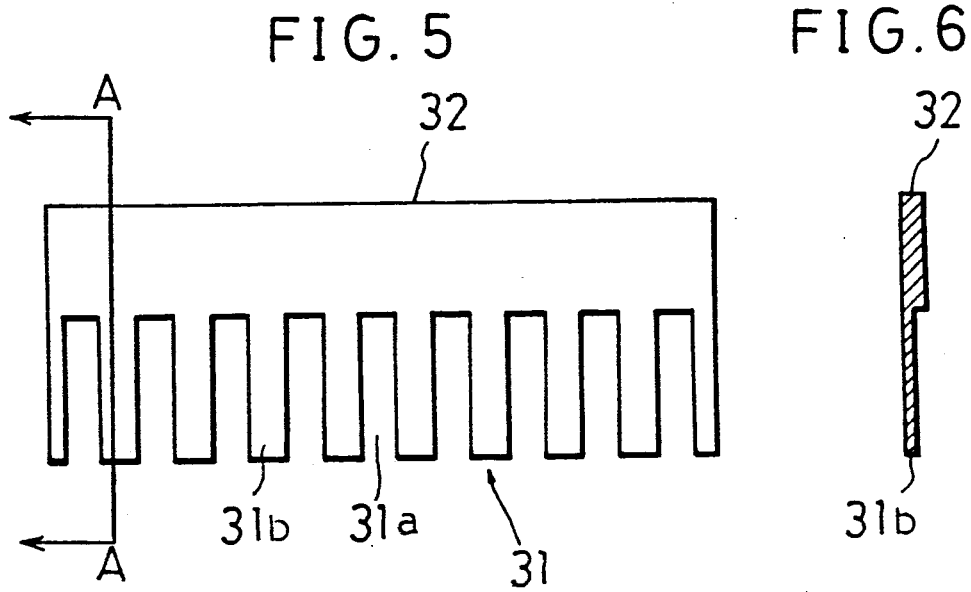
FIG. 5
FIG. 6

METALLIC SUPPORT FOR EXHAUST GAS PURIFYING CATALYST

BACKGROUND OF THE INVENTION

1. Field of the Invention

The present invention relates to a metallic support for an exhaust gas purifying catalyst for an internal combustion engine.

2. Description of the Prior Art

As an example of a conventional metallic support for an exhaust gas purifying catalyst, a metallic support disclosed in Japanese Unexamined Patent Publication (KOKAI) No. 4373/1981 has been known. The metallic support is manufactured as follows: A flat plate and a corrugated plate are superimposed and wound in a roll shape to form a honeycomb body, and then the honeycomb body is accomodated in an outer cylinder made of metal. In the metallic support, the flat plate and the corrugated plate of the honeycomb body as well as the honeycomb body and the outer cylinder are usually joined integrally by brazing.

Further, the metallic support is made into an exhaust gas purifying catalyst by forming a catalyst carrier layer on surfaces of honeycomb passages and loading noble metal into the catalyst carrier layer. The exhaust gas purifying catalyst is disposed in an exhaust system of an internal combustion engine, thereby purifying hydrocarbons (HC), carbon monoxide (CO) and nitrogen oxides (NOx) and the like in an exhaust gas. Since it has been know that it is advantageous to make the areas of the honeycomb passages as large as possible in a limited volume, the thickness of the flat plate and the corrugated plate are made as thin as possible so far as the strengths thereof are maintainable.

Here, the exhaust gas passing through the honeycomb body exhibits a higher flow velocity at a central portion of the honeycomb body than at an outer peripheral portion thereof. Accordingly, in the metallic support, the honeycomb body comes to exhibit a temperature distribution being higher at the central portion thereof and lower at the peripheral portion thereof because of the contact with the high temperature exhaust gas, the heat generated by the catalyst reactions and the heat radiation from the outer cylinder to the environment. The temperature distribution results in a difference between the expansion amounts of the honeycomb body and the outer cylinder and a difference between the contraction amounts thereof. Since the movements of the expansion and the contraction of the honeycomb body in a radial direction and an axial direction are restricted by the outer cylinder, and since the thickness of the flat plate and the corrugated plate constituting the honeycomb body are remarkably thinner than that of the outer cylinder, the honeycomb body is subjected to a thermal stress. As a result, the corrugated plate of the honeycomb body is deformed plastically at an outer most circumferential portion thereof by the repeated expansion and contraction, it comes to suffer from metal fatigue, and eventually it breaks.

In order to avoid the drawback, a metallic support is proposed in Japanese Unexamined Utility Model Publication (KOKAI) No. 194436/1987. In the metallic support, one end of a honeycomb body is joined to an outer cylinder, and the other end thereof is not joined thereto, namely the other end thereof is made into a free end. According to the metallic support, the expansion and the contraction of the honeycomb body in an axial direction are not restricted by the outer cylinder substantially. However, the expansion and the contraction of the honeycomb body in an essential radial direction are restricted by the outer cylinder at the joined end of the honeycomb body as it is restricted in the above-mentioned conventional metallic support. Consequently, there is a fear for breaking a corrugated plate of the honeycomb body at the joined end thereof.

Further, another metallic support is proposed in Japanese Unexamined Utility Model Publication (KOKAI) No. 77634/1988. The metallic support has a honeycomb body whose flat plate has a thickness larger than that of a corrugated plate. In the metallic support, since the rigidity thereof is secured by the flat plate, the amounts of the expansion and the contraction are reduced. Further, since the corrugated plate deforms as a whole in a uniform manner substantially, breakage due to a localized deformation can be prevented from happening. However, since the thickness of the flat plate has been made thicker, the flat plate has exerted an increased resistance to an exhaust gas passing through an exhaust system of an internal combustion engine. Therefore, such an arrangement is not favorable in view of the exhaust performance and the pressure loss.

SUMMARY OF THE INVENTION

The present invention has been developed in view of the above-mentioned circumstances. It is therefore an object of the present invention to prevent a honeycomb body from breaking further reliably.

A metallic support for an exhaust gas purifying catalyst according to the present invention comprises: a honeycomb body including a flat plate and a corrugated plate superimposed and wound in a roll shape; an outer cylinder disposed around the honeycomb body coaxially therewith; and an intermediate cylinder interposed between the honeycomb body and the outer cylinder, the intermediate cylinder having a plurality of flexible portions disposed on at least one of ends thereof at predetermined intervals in series in a circumferential direction thereof, the flexible portions being deformable in directions reducing and enlarging the intervals and joined to one of the honeycomb body and the outer cylinder, and the other end of the intermediate cylinder joined to the other one of the honeycomb body and the outer cylinder.

The honeycomb body is formed by winding the superimposed flat plate and corrugated plate in a roll shape. The corrugated plate is formed by bending a flat plate into a corrugated shape. The corrugated plate is usually made of an identical material with that of the flat plate, and usually has an identical thickness with that of the flat plate. For example, the flat plate and the corrugated plate may be formed of an Al-Cr-Fe alloy, stainless steel and the like similar to the one employed in the conventional metallic support. As mentioned above, since it is advantageous to make the areas of the honeycomb passages as large as possible in a limited volume, the thicknesses of the flat plate and the corrugated plate are made to a relatively thin dimension, for instance, to 0.05 mm. The honeycomb body may be formed as follows: The corrugated plate is first coated with a brazing metal at the top portions, and is superimposed on the flat plate. The superimposed corrugated plate and flat plate are wound in a roll shape, and heated thereafter. Thus, the flat plate and the corrugated plate are joined integrally by brazing. Here, the flat plate and the corrugated plate may be joined integrally by diffusion welding.

The outer cylinder may be formed of stainless steel and the like similar to the one employed in the outer cylinder of the conventional metallic support, and a thickness thereof may be made to a dimension identical with that of the conventional outer cylinder. For instance, the thickness of the outer cylinder is usually made to 1 to 2 mm.

A major feature of the present invention lies in the intermediate cylinder interposed between the outer cylinder and the honeycomb body. The intermediate cylinder has a plurality of flexible portions disposed on at least one of the ends thereof. The flexible portions are arranged at predetermined intervals in series in a circumferential direction of the intermediate cylinder, and made deformable in directions reducing and enlarging the intervals between them. As for the flexible portions, it is possible to employ a comb shape arrangement, an arrangement having slot-like slits and the like, for instance. Further, the flexible portions may be formed in various configurations as disclosed in preferred embodiments hereinafter described. The flexible portions are joined to either one of an outer peripheral surface of the honeycomb body and an inner peripheral surface of the outer cylinder. When the intermediate cylinder is subjected to the forces of the expansion and the contraction exerted by the honeycomb body or the outer cylinder, the flexible portions deform in directions enlarging and reducing the intervals between them. Thus, the forces of the expansion and the contraction are absorbed by the deformations of the flexible portions.

The intermediate cylinder is joined to the honeycomb body and the outer cylinder in the following manner: The flexible portions disposed on one end of the intermediate cylinder is jointed to one of the honeycomb body and the outer cylinder, and the flexible portions disposed on the other end thereof is joined to the other one of the honeycomb body and the outer cylinder. Namely, since the outer cylinder, the intermediate cylinder and the honeycomb body are not joined simultaneously and integrally in a cross section of the metallic support cut with a plane perpendicular to an axis thereof, the intermediate cylinder is held by the outer cylinder at one end thereof in a cantilever-like manner and the honeycomb body is held by the intermediate cylinder at one end thereof in a cantilever-like manner. As a result, the expansion and contraction movements of the honeycomb body in the radial directions and the axial directions have come not to be restricted by the outer cylinder, and the thermal stress has been prevented from generating in the honeycomb body. Thus, it is possible to prevent the honeycomb body from breaking much more reliably.

The flexible portions may be formed only on one of the ends of the intermediate cylinder. However, it is more preferable to form the flexible portions on both ends of the intermediate cylinder. If such is the case, it is possible to absorb the forces of the expansion and the contraction exerted by both of the honeycomb body and the outer cylinder, thereby preventing the thermal stress from generating in the intermediate cylinder. Here, in the case that the flexible portions are formed only on one end of the intermediate cylinder, it is preferable to join the flexible portions to an outer peripheral surface of the honeycomb body. This is because the honeycomb body expands and contracts by a larger amount than the outer cylinder does.

A material for making the intermediate cylinder is not specified in particular. However, it is preferable to make the intermediate cylinder of a material having a linear expansion coefficient which falls between the linear expansion coefficients of the materials for making the outer cylinder and the honeycomb body. If such an arrangement is employed, the intermediate cylinder can carry out its functions and offer its advantages to the maximum extent.

In the metallic support according to the present invention, one end of the intermediate cylinder is joined to one of the honeycomb body and the outer cylinder, and the other end of the intermediate cylinder is joined to the other one of the honeycomb body and the outer cylinder. Further, the intermediate cylinder has the flexible portions disposed on at least one of the ends of the intermediate cylinder in series in a circumferential direction thereof. In accordance with the expansion and contraction movements of at least one of the honeycomb body and the outer cylinder, the flexible portions deform in directions reducing and enlarging the intervals disposed between them.

For instance, in the case that the flexible portions are joined to the honeycomb body, the flexible portions deform in the directions enlarging the intervals disposed between them and one end of the intermediate cylinder increases its diameter when the honeycomb body is expanded by heat. On the contrary, when the honeycomb body is cooled and contracted, the flexible portions deform in the directions reducing the intervals disposed between them and one end of the intermediate cylinder reduces its diameter. Under the circumstances, since one end of the intermediate cylinder is not joined to the outer cylinder, no movements of the honeycomb body can be restricted by the outer cylinder. Accordingly, the movements of the expansion and contraction of the honeycomb body in the radial directions are absorbed by the deformations of the flexible portions. Further, since the honeycomb body is joined to the intermediate cylinder only at one end thereof, the other end of the honeycomb body is a free end. Accordingly, the movements of the expansion and contraction of the honeycomb body in the axial directions cannot be restricted.

Thus, according to the metallic support of the present invention, since the honeycomb body and the outer cylinder are not joined directly and the honeycomb body can expand and contract freely in the axial and radial directions, the thermal stress has been securely prevented from generating in the honeycomb body, the honeycomb body has been prevented from breaking, and the durability of the honeycomb body has been improved remarkably.

Further, since the intermediate cylinder is joined to the honeycomb body and the outer cylinder at the both ends thereof respectively, it is in contact with them in small areas, and there is formed clearances between the outer cylinder and the intermediate cylinder which are not in contact with each other and between the intermediate cylinder and the honeycomb body which are not in contact with each other. Accordingly, there is exhibited a low thermal conductivity between the honeycomb body and the outer cylinder, and the honeycomb body can enjoy an adiabatic effect. Namely, in the case that the honeycomb body is employed in an exhaust gas catalyst and subjected to an exhaust gas at the time of starting up an engine, the temperature of the honeycomb body increases rapidly, thereby improving the exhaust gas purifying performance at the time of starting up an engine. Similarly, since the honeycomb body is prevented from being cooled by the outer cylinder, the temperature distribution in the honeycomb body becomes uniform and the thermal stress is further prevented from generating in the honeycomb body, thereby further improving the durability of the honeycomb body.

In addition, in the conventional metallic supports, a brazing metal is coated on or a brazing foil is wound around an outer surface of the honeycomb body or an inner surface of the outer cylinder at first, and then the honeycomb body and the outer cylinder are joined together after assembling and heating them. However, the conventional joining has been less reliable because of an unevenly coated brazing metal or a comeoff brazing foil. On the contrary, since an intermediate cylinder, which is covered or cladded with a brazing metal on the portions to be joined, can be used when manufacturing the metallic support according to the present invention, the quality of joining has been improved and the joining operation has been simplified.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a development of an intermediate cylinder employed in the metallic support;

FIG. 4 is a development of an intermediate cylinder employed in a metallic support of a second preferred embodiment according to the present invention;

FIG. 5 is a development of an intermediate cylinder employed in a metallic support of a third preferred embodiment according to the present invention;

FIG. 6 is a cross sectional view illustrating a modified version of the intermediate cylinder employed in the metallic support of the third preferred embodiment and taken in the direction of arrow "A—A" of FIG. 5;

DETAILED DESCRIPTION OF THE PREFERRED EMBODIMENTS OF THE INVENTION

Having generally described the present invention, a further understanding can be obtained by reference to certain specific preferred embodiments which are provided herein for purposes of illustration only and are not intended to be limiting unless otherwise specified. The preferred embodiments will be described in detail with reference to the accompanying drawings.

FIRST PREFERRED EMBODIMENT

Figure 1:
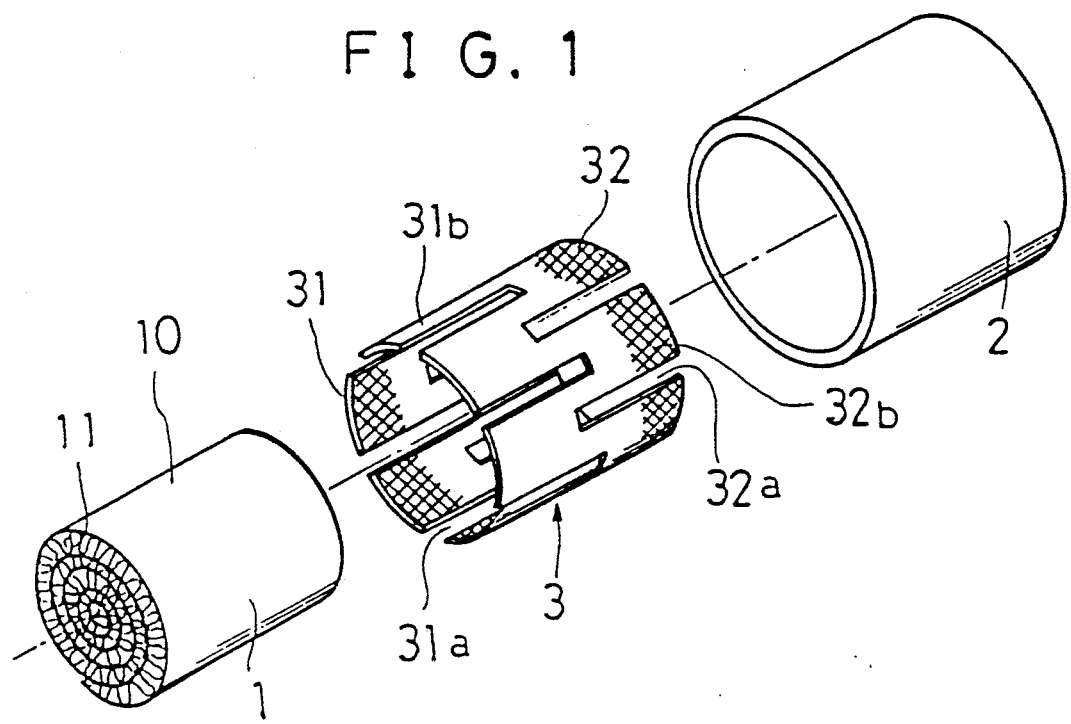
FIG. 1 is a perspective view illustrating an arrangement of a metallic support of a first preferred embodiment according to the present.
Figure 2:
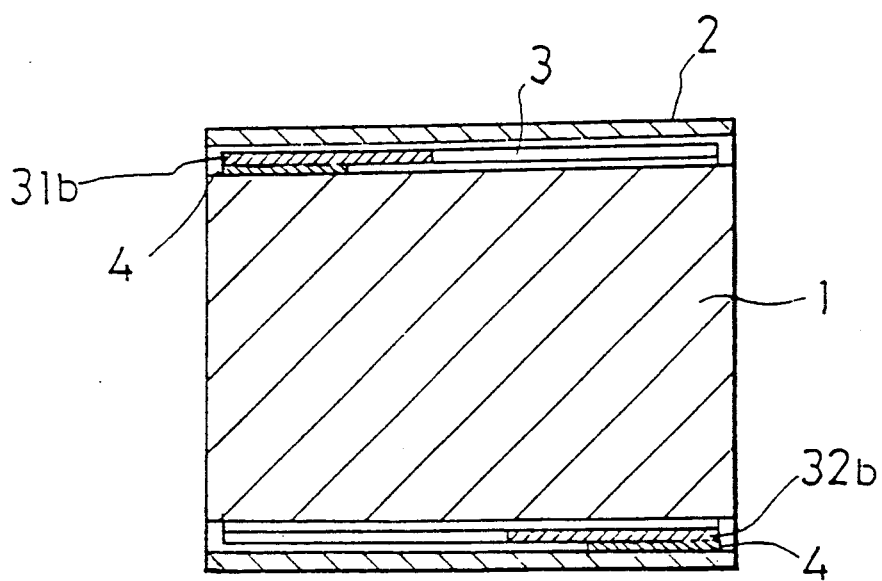
FIG. 2 is a cross sectional view of the metallic support.

FIGS. 1 and 2 illustrate a metallic support for an exhaust gas purifying catalyst of a first preferred embodiment according to the present invention. The metallic support comprises a honeycomb body 1, an outer cylinder 2 and an intermediate cylinder 3.

The honeycomb body 1 comprises a flat plate 10 which has a thickness of 0.05 mm and is made of an Al-Cr-Fe alloy, and a corrugated plate 11 which is formed by bending a flat plate 10 in a corrugated manner. The flat plate 10 and the corrugated plate 11 are superimposed, and wound in a roll shape with the flat plate 10 disposed on an exterior side. Further, a brazing metal is interposed between the flat plate 10 and the top portions of the corrugated plate 11, and the flat plate 10 and the corrugated plate 11 are joined integrally by brazing.

The outer cylinder 2 is made of stainless steel, and is formed in a cylindrical shape having a thickness of 1.5 mm.

A development of the intermediate cylinder 3 is illustrated in FIG. 3. As illustrated in FIG. 3, the intermediate cylinder 3 has slits 31a and 32a formed respectively on one end 31 and another end 32. The slits 31a and 32a extend in an axial direction of the intermediate cylinder 3, and are disposed alternately in a circumferential direction of the intermediate cylinder 3. Further, a plurality of flexible portions 31b having a comb-like shape as a whole are formed on both sides of the slits 31a and disposed in series in the circumferential direction of the intermediate cylinder 3, and a plurality of flexible portions 32b having a comb-like shape as a whole are formed on both sides of the slits 32a and disposed in series in the circumferential direction of the intermediate cylinder 3. Here, the intermediate cylinder 3 has a thickness of 0.3 mm and is made of an Al-Cr-Fe alloy. Furthermore, the intermediate cylinder 3 has a linear expansion coefficient of $13.5 \times 10^{-6}/°C.$, the honeycomb body 1 has a linear expansion coeffiecient of $15 \times 10^{-6}/°C.$, and the outer cylinder has a linear expansion coeffiecient of $12 \times 10^{-6}/°C.$ Thus, the intermediate cylinder 3 has a linear expansion coefficient value falling between those of the honeycomb body 1 and the outer cylinder 2.

The intermediate cylinder 3 is interposed between the honeycomb body 1 and the outer cylinder 2. As illustrated in FIG. 2, an inner peripheral surface of the flexible portions 31b on one end 31 of the intermediate cylinder 3 is brazed and joined to an outer peripheral surface of the honeycomb body 1, and an outer peripheral surface of the flexible portions 32b on the other end 32 of the intermediate cylinder 3 is brazed and joined to an inner peripheral surface of the outer cylinder 2. Further, a middle portion of the intermediate cylinder 3 between one end 31 and the other end 32 is not at all joined to the honeycomb body 1 and the outer cylinder 2. In addition, brazed portions 4 illustrated in FIG. 2 are formed of a brazing metal covered or cladded in a ring-like shape in advance on predetermined portions of the intermediate cylinder 3, i.e., hatched portions of the intermediate cylinder 3 illustrated in FIG. 1. An axial width of the brazed portions 4, or a length of the brazed portions 4 measured from the end surfaces of the intermediate cylinder 3, is set so that it is shorter than a length of the slits 31a and 32a measured from the end surfaces of the intermediate cylinder 3.

In the metallic support of the first preferred embodiment thus arranged, when the honeycomb body 1 is expanded by heat in radial directions, the flexible portions 31b is deformed by the force of the expansion so that the slits 31a open up. Here, since the flexible portions 31b are not joined to the outer cylinder 2, the movements of the flexible portions 31b are not prevented from happening, the movements which enlarge the diameter of the intermediate cylinder 3. Accordingly, the force of the expanding honeycomb body 1 has been absorbed by the deformations of the flexible portions 31b, and the thermal stress has been prevented from acting on the honeycomb body 1. Likewise, since the other end 32 of the intermediate cylinder 3 is joined to the outer cylinder 2 by way of the flexible portions 32b, the forces resulting from the expansion of the outer cylinder 2 and intermediate cylinder 3 are absorbed by the deformations of the flexible portions 32b. Accordingly, the thermal stress has been also prevented from acting on the intermediate cylinder 3. When the metallic support is cooled, the flexible portions 31b and 32b deform in the directions narrowing the slits 31a and 32a, thereby preventing the thermal stress from acting on the honeycomb body 1 and the intermediate cylinder 3 similarly.

Further, since the honeycomb body 1 is joined to one end 31 of the intermediate cylinder 3 at one end thereof only, the other end of the honeycomb body 1 is a free end accordingly. As a result, the movements of the expansion and contraction of the honeycomb body 1 in the axial directions are not restricted, and thus the arrangement has also effected to prevent the thermal stress from acting on the honeycomb body 1.

Furthermore, except the brazed portions 4, annular clearances of approximately 0.1 mm in thickness are formed and air layers are interposed between the honeycomb body 1 and the intermediate cylinder 3 and between the intermediate cylinder 3 and the outer cylinder 2. Since the honeycomb body 1 and the outer cylinder 2 are disposed in an adiabatic manner, the exhaust gas purifying performance of an exhaust gas purifying catalyst including the metallic support has been improved at the time of starting up an engine. Similarly, since the temperatures of the honeycomb body 1 become uniform therein, the thermal stress has been further prevented from generating therein.

SECOND PREFERRED EMBODIMENT

A metallic support for an exhaust gas purifying catalyst of a second preferred embodiment according to the present invention is similar to that of the first preferred embodiment except that it has an intermediate cylinder 3 of a different arrangement. A development of the intermediate cylinder 3 is illustrated in FIG. 4. As illustrated in FIG. 4, the intermediate cylinder 3 has slits 31a and 32a facing each other and flexible portions 31b and 32b disposed on a straight line. Also in the second preferred embodiment, the axial width of the brazed portions 4 is set so that it does not exceed the length of the slits 31a and 32a. The axial width of the brazed portions 4 is set in this manner because the deformations of the flexible portions 31b and 32b are prevented from happening by the brazed portions 4 when the brazing is performed over a length exceeding the length of the slits 31a and 32a.

THIRD PREFERRED EMBODIMENT

A metallic support for an exhaust gas purifying catalyst of a third preferred embodiment according to the present invention is also similar to that of the first preferred embodiment except that it has an intermediate cylinder 3 of a different arrangement. A development of the intermediate cylinder 3 is illustrated in FIG. 5. As illustrated in FIG. 5, the intermediate cylinder 3 has a flat shape in which slits 31a and flexible portions 31b are formed on one end 31 thereof only, and in which nothing is formed on the other end 32. The one end 31 of the intermediate cylinder 3 is to be joined to the honeycomb body 1, and the other end 32 thereof is to be joined to the outer cylinder 2. The arrangement of the third preferred embodiment, in which the flexible portions 31b are formed only on one end 31 of the intermediate cylinder 3 to be joined to the honeycomb body 1, also produces the advantages of the first preferred embodiment, but to a less extent. Therefore, the honeycomb body 1 has been less likely to break than the conventional metallic supports, and the reliability of the honeycomb body 1 has been improved further than that of the conventional metallic supports.

In addition, the intermediate cylinder 3 of the third preferred embodiment may have a uniform thickness. However, as illustrated in FIG. 6, i.e., a cross sectional view taken in the direction of arrow "A—A" of FIG. 5, the flexible portions 31b may have a thickness thinner than that of the other end 32 of the intermediate cylinder 3. When such an arrangement is employed, the honeycomb body 1 has been further prevented from breaking because the flexible portions 31b deform much more easily.

FOURTH PREFERRED EMBODIMENT

Figure 7:
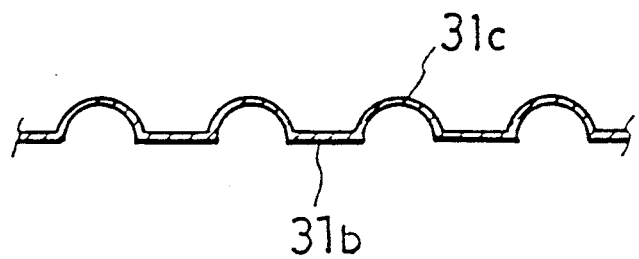
FIG. 7 is a cross sectional view illustrating a major portion of a developed intermediate cylinder employed in a metallic support of a fourth preferred embodiment according to the present invention.

In the metallic supports for an exhaust gas purifying catalyst of the above-mentioned preferred embodiments, the flexible portions 31b or 32b are made deformable by disposing the slits 31a or 32a therebetween. However, as illustrated in a cross sectional view of FIG. 7, the flexible portions 31b or 32b are made deformable by disposing the deforming portions 31c having a "U"-shape cross section between the flexible portions 31b or 32b. Even when such an arrangement is employed, the flexible portions 31b or 32b can deform in both of the directions reducing and enlarging the intervals disposed between them.

FIFTH PREFERRED EMBODIMENT

Figure 8:
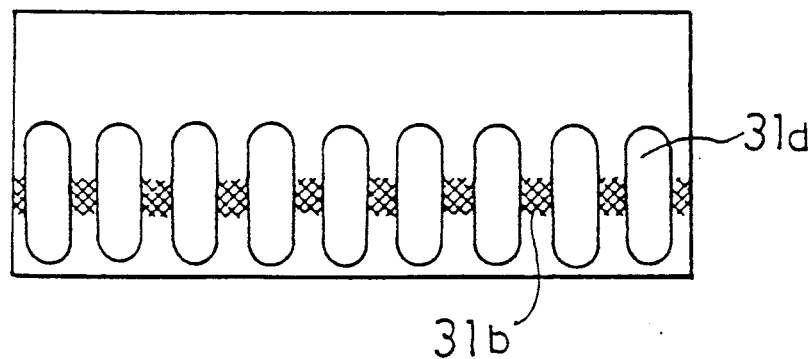
FIG. 8 is a development of an intermediate cylinder employed in a metallic support of a fifth preferred embodiment according to the present invention.

Further, as illustrated in FIG. 8, an intermediate cylinder 3 may have slits 31d formed in a slot-like shape, and a ladder-like portion defined by the slot-like slits 31d in the intermediate cylinder 3 may be made into flexible portions 31b. In the case that such an arrangement is employed, it is preferred to partially carry out brazing at hatched portions of the flexible portions 31b on the intermediate cylinder 3, as illustrated in FIG. 8, in order to make the deformations of the flexible portions 31b easier.

SIXTH PREFERRED EMBODIMENT

Figure 9:
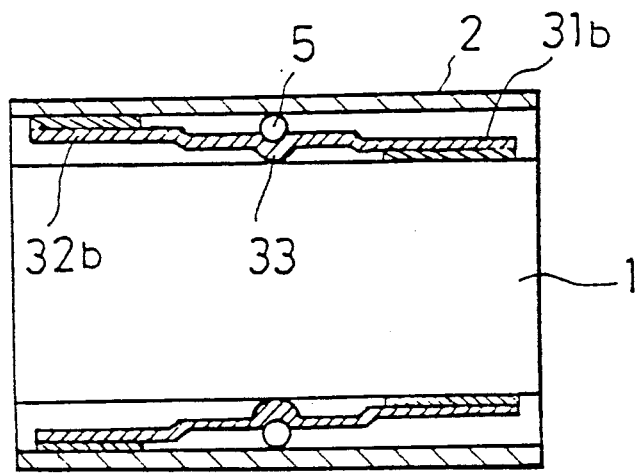
FIG. 9 is a cross sectional view illustrating a metallic support of a sixth preferred embodiment according to the present invention.

FIG. 9 illustrates a cross sectional view of a metallic support of a sixth preferred embodiment according to the present invention. The metallic support includes another intermediate cylinder 3. The intermediate cylinder 3 has a ring-like groove 33 formed on an outer peripheral surface thereof, disposed at a central position in an axial direction thereof and extending in a circumferential direction thereof, and a ring-like seal member 5 is further held in the groove 33. Moreover, a configuration of the intermediate cylinder 3 is formed so that its diameter increases gradually from one end to the other end. Other than these features, the metallic support of the sixth preferred embodiment has similar arrangements with that of the metallic support of the second preferred embodiment.

In the metallic support of the sixth preferred embodiment, the diameter of the intermediate cylinder 3 is varied gradually, whereby the enlarging amounts of the intermediate cylinder 3 is further increased in the axial direction. In addition, there are formed annular clearances between the honeycomb body 1 and the intermediate cylinder 3 and between the intermediate cylinder 3 and the outer cylinder 2, and there is a possibility that an exhaust gas is exhausted through the clearances without being purified when the thicknesses of the annular clearances are large. In the metallic support of the sixth preferred embodiment, however, the seal member 5 is elastically brought into contact with the outer cylinder 2 and the intermediate cylinder 3, and the bottom portion of the groove 33 narrows the annular clearance between the honeycomb body 1 and the intermediate cylinder 3. Thus, an unpurified exhaust gas has been prevented from leaking through the annular clearances.

Having now fully described the present invention, it will be apparent to one of ordinary skill in the art that many changes and modifications can be made thereto without departing from the spirit or scope of the present invention as set forth herein.

What is claimed is:

1. A metallic support for an exhaust gas purifying catalyst comprising:
   a honeycomb body including a flat plate and a corrugated plate superimposed and wound in a roll shape;
   an outer cylinder disposed around said honeycomb body coaxially therewith; and
   an intermediate cylinder interposed between said honeycomb body and said outer cylinder, said intermediate cylinder having a plurality of flexible portions disposed on at least one of ends thereof at predetermined intervals in series in a circumferential direction thereof, said flexible portions being deformable in directions reducing and enlarging said intervals and joined to one of said honeycomb body and said outer cylinder, and the other end of said intermediate cylinder joined to the other one of said honeycomb body and outer cylinder.

2. The metallic support for an exhaust gas purifying catalyst according to claim 1, wherein said honeycomb body has a given linear expansion coefficient, said outer cylinder has a linear expansion coefficient smaller than that of said given linear expansion coefficient of said honeycomb body, and said intermediate cylinder has a linear expansion coefficient falling in a range from said linear expansion coefficient of said outer cylinder to said given linear expansion coefficient of said honeycomb body.

3. The metallic support for an exhaust gas purifying catalyst according to claim 1, wherein said intermediate cylinder is joined to one of said honeycomb body and said outer cylinder by brazing, and brazed portions have a length measured from said ends of said intermediate cylinder in an axial direction thereof, said length being shorter than a length of said intervals measured from said ends of said intermediate cylinder in said axial direction thereof.

4. The metallic support for an exhaust gas purifying catalyst according to claim 1, wherein said flexible portions are formed on both ends of said intermediate cylinder.

5. The metallic support for an exhaust gas purifying catalyst according to claim 4, wherein said flexible portions formed on both sides of said intermediate cylinder are disposed alternately on one end of said intermediate cylinder and on another end thereof.

6. The metallic support for an exhaust gas purifying catalyst according to claim 4, wherein said flexible portions formed on both sides of said intermediate cylinder are disposed on a straight line in an axial direction of said intermediate cylinder.

7. The metallic support for an exhaust gas purifying catalyst according to claim 1, wherein said flexible portions are formed only on one end of said intermediate cylinder, and said flexible portions are joined to an outer peripheral surface of said honeycomb body.

8. The metallic support for an exhaust gas purifying catalyst according to claim 7, wherein another end of said intermediate cylinder has a given thickness, and said one end thereof with said flexible portions formed has a thickness thinner than said given thickness of said another end thereof.

9. The metallic support for an exhaust gas purifying catalyst according to claim 1, wherein said flexible portions are disposed between said intervals formed in a "U"-shape cross section.

10. The metallic support for an exhaust gas purifying catalyst according to claim 1, wherein said flexible portions are disposed between said intervals formed in a slot-like slit.

11. The metallic support for an exhaust gas purifying catalyst according to claim 1, wherein said intermediate cylinder further includes a ring-like groove formed on an outer peripheral surface thereof, disposed at a central portion in an axial direction thereof, extending in an circumferential direction thereof and contacting with said honeycomb body at a bottom, and a ring-like seal member held in said ring-like groove and disposed between said intermediate cylinder and said outer cylinder in an air-proof manner, and said intermediate cylinder has a diameter gradually increasing from one end thereof to another end thereof.

* * * * *